US007692346B2

(12) United States Patent
Kobayashi et al.

(10) Patent No.: US 7,692,346 B2
(45) Date of Patent: Apr. 6, 2010

(54) VIBRATOR

(75) Inventors: Kazuhiro Kobayashi, Fujiyoshida (JP); Hiroo Kajiwara, Fujiyoshida (JP)

(73) Assignee: Citizen Electronics Co., Ltd, Fujiyoshida-shi, Yamanashi-ken (JP)

( * ) Notice: Subject to any disclaimer, the term of this patent is extended or adjusted under 35 U.S.C. 154(b) by 240 days.

(21) Appl. No.: 11/876,254

(22) Filed: Oct. 22, 2007

(65) Prior Publication Data

US 2008/0119768 A1 May 22, 2008

(30) Foreign Application Priority Data

Oct. 23, 2006 (JP) ............................ 2006-287176

(51) Int. Cl.
*H02K 7/06* (2006.01)
*H04M 1/03* (2006.01)

(52) U.S. Cl. ..................................... 310/81; 340/388.1

(58) Field of Classification Search .............. 310/12.16, 310/12.31, 14, 81; 340/311.1, 388.1, 407.1, 340/7.6, 7.62

See application file for complete search history.

(56) References Cited

U.S. PATENT DOCUMENTS 6,208,237 B1 * 3/2001 Saiki et al. ............... 340/388.1
6,326,711 B1 * 12/2001 Yamaguchi et al. ........... 310/81
6,417,589 B1 * 7/2002 Kuyama et al. ............... 310/81
6,720,691 B2 * 4/2004 Yoneyama et al. ............ 310/81
7,436,088 B2 * 10/2008 Miura ......................... 310/14
2006/0226714 A1 * 10/2006 Miura ......................... 310/12

FOREIGN PATENT DOCUMENTS

JP 2963917 B 8/1999
JP 2006-203709 A 8/2006

* cited by examiner

*Primary Examiner*—Tran N Nguyen
(74) *Attorney, Agent, or Firm*—Brinks Hofer Gilson & Lione

(57) ABSTRACT

A compact enclosed type vibrator capable of ensuring a large amount of vibration has a casing (5), a coil (10) and a magnetic circuit unit (11) provided in the casing, and a suspension (3) supporting the magnetic circuit unit. The magnetic circuit unit has an extent in the radial direction and has an outer peripheral surface set adjacent to the inner peripheral surface of the casing across an annular gap. At least one of the casing and the magnetic circuit unit is provided with a vent passage (13*a* and 13*b*) that additionally communicates between a first space (17) and a second space (18) formed at the upper and lower sides of the magnetic circuit unit.

6 Claims, 6 Drawing Sheets

VIBRATOR

This application claims priority under 35 U.S.C. §119 to Japanese Patent application No. JP2006-287176 filed on Oct. 23, 2006, the entire contents of which are hereby incorporated by reference.

TECHNICAL FIELD

The present invention relates to vibrators that may be incorporated in portable devices such as mobile phones and watches or in small-sized devices such as toys. More particularly, the present invention relates to a vibrator for use in a mobile phone to inform the user of an incoming call, for example.

RELATED CONVENTIONAL ART

Conventionally, portable terminal devices such as mobile phones have a vibrator incorporated therein as a device that informs the user of an incoming call by vibration of the mobile phone body, and there has been a demand for reductions in weight, thickness and length of the vibrator. Under these circumstances, the present applicant proposed a vibrator as shown in FIG. 10 (see Japanese Patent Application Publication No. 2006-203709) that can be reduced in size without an increase in cost and that is improved in the rising characteristic of vibration.

The proposed vibrator includes a coil 10, a magnetic circuit unit 11 that magnetically interacts with the coil 10, and a suspension 3 that resiliently supports the magnetic circuit unit 11. When the coil 10 is supplied with a signal current, the magnetic circuit unit 11 is reciprocated in the axial direction (direction of the arrow B) of the coil 10 in the vicinity of a resonance frequency determined by the weight of the magnetic circuit unit 11 and the suspension 3, thereby generating vibration.

The magnetic circuit unit 11 has a columnar magnet 8, a yoke 9 abutting on one end surface of the magnet 8, and a top plate 2 placed in abutting contact with the other end surface of the magnet 8. Further, a weight 7 is attached to the yoke 9. The coil 10, the magnetic circuit unit 11 and the suspension 3 are housed in a casing 5. The casing 5 has a frame 4 surrounding the magnetic circuit unit 11, a board 1 that has the coil 10 secured thereto and that closes one end opening of the frame 4, and a protector 6 that closes the other end opening of the frame 4.

In construction of the conventional vibrator, reducing the value of a gap d between the inner wall of the frame 4 and the outer peripheral surface of the weight 7 enables an increase in the volume of the weight 7 of the magnetic circuit unit 11, which is a vibrating member of the vibrator. This means that the mass of the weight 7 can be increased. That is, vibration force obtainable from the vibrator can be increased. When an external force acts on the vibrator, displacement of the magnetic circuit unit 11 in a direction perpendicular to the direction of vibration thereof can be limited to a small extent, so that the coil 10 can be prevented from being damaged (broken).

However, reducing the value of the gap d between the inner wall of the frame 4 and the outer peripheral surface of the weight 7 in the conventional vibrator results in a reduction in the area of the passage of air between a first space 17 and a second space 18 facing each other across the magnetic circuit unit 11 in an axial direction in which the magnetic circuit unit 11 reciprocates. This causes an interference with the movement of air between the first and second spaces 17 and 18 induced by the reciprocating motion of the magnetic circuit unit 11. Consequently, the vibration of the magnetic circuit unit 11 within the casing 5 is suppressed. In other words, the reciprocating motion of the casing 5 against the magnetic circuit unit 11 is relatively suppressed. It should be noted that the coil 10 is completely restrained by the board 1 connected with the casing 5 and hence does not vibrate.

A measure to solve the above-described problem may be as follows. As shown in FIG. 11, the interior of the casing 5 is not formed as an enclosed space, but openings **4*a* and 4*b* are provided in the side wall of the frame 4 to form air vents, thereby eliminating the suppression of the vibration of the magnetic circuit unit 11 due to fluctuations of pressure in the first and second spaces 17 and 18. With this method, however, sound generated inside the casing 5 leaks out of it through the openings 4*a* and 4*b* of the frame 4, resulting in audible noise, unfavorably. Further, undesired sound may be generated when air flows in and out of the casing 5 through the openings 4*a* and 4*b* of the frame 4. It is also likely that external contamination may be sucked into the casing 5 as air flows thereinto through the openings 4*a* and 4*b*, causing an operation trouble of the vibrating system and hence degrading reliability. It should be noted that the same is the case with the other openings of the casing 5, i.e. an opening 1*a* in the board 1, and an opening 6*a* in the protector 6. Thus, the vibrator according to the conventional art suffers from the problem that when the casing 5 housing the magnetic circuit unit 11** is formed in an enclosed compact structure in order to avoid the generation of noise and to ensure reliability, the vibration level cannot be satisfactorily increased, and when the vibrator is incorporated in a mobile phone or the like, it is difficult to surely inform the user of an incoming call by vibration.

SUMMARY OF THE INVENTION

Accordingly, an object of the present invention to solve the problem is to provide a compact enclosed type vibrator capable of ensuring a large amount of vibration and yet capable of being mounted in small portable devices such as mobile phones.

To attain the above-described object, the present invention provides a vibrator including a tubular casing that defines an enclosed space, and a coil disposed in the casing in coaxial relation thereto. The vibrator further includes a magnetic circuit unit disposed in the casing in coaxial relation thereto. The magnetic circuit unit has an extent in the radial direction to define a first space and a second space at both sides of said magnetic circuit unit in an axial direction of the tubular casing. The magnetic circuit unit has an outer peripheral surface positioned adjacent to an inner peripheral surface with an annular gap interposed between said outer peripheral surface and the inner peripheral surface. The vibrator further includes a suspension that resiliently supports the magnetic circuit unit such that the magnetic circuit unit is vibratable in the axial direction of the tubular casing in response to supply of a signal current to the coil, and a vent passage that provides communication in the casing between a first space and a second space formed at both sides of the magnetic circuit unit in the direction of vibration of the magnetic circuit unit. The vent passage is formed through at least one of the casing and the magnetic circuit unit.

In the vibrator of the present invention, the first and second spaces are communicated with each other by an annular gap between the inner wall surface of the tubular casing and the outer peripheral surface of the magnetic circuit unit, and a vent passage is additionally provided on at least either the casing or the magnetic circuit unit. Even if such a vent passage is not provided, the area of the fluid passage formed by the gap to communicate between the first and second spaces can be increased by increasing the width of the gap. However, the gap is long, extending over the entire periphery of the magnetic circuit unit. Therefore, the fluid resistance offered by the increased portion of the gap is higher than in the additionally provided vent passage even if the area of the increased fluid passage is the same as the area of the vent passage additionally provided. In the present invention, a vent passage is additionally provided to perform efficient fluid communication between the first and second spaces, thereby making it possible to facilitate the relative movement between the casing and the magnetic circuit unit and hence possible to increase the vibration level of the vibrator. As a result, it becomes possible to implement a vibrator that can surely inform the user of an incoming call by vibration when mounted in a mobile phone or other small-sized portable devices.

In addition, because the interior of the casing is closed to form an enclosed type vibrator, it is possible to prevent sound generated in the interior of the casing from leaking out of it as audible noise. Further, no external contamination can enter the casing. Accordingly, it is possible to prevent the occurrence of interference with vibration and hence possible to improve reliability.

Specifically, the vent passage may have at least one recess formed in the inner peripheral surface of the casing to extend between the first and second spaces.

In another specific example, the vent passage may have at least one recess formed in the outer peripheral surface of the magnetic circuit unit, which is adjacent to the inner peripheral surface of the casing, to extend between the first and second spaces.

In still another specific example, the vent passage may have at least one through-hole extending through the magnetic circuit unit in the direction of vibration.

More specifically, the magnetic circuit unit may have a columnar magnet, a yoke rigidly secured to one of the opposite end surfaces of the magnet, a top plate rigidly secured to the other of the opposite end surfaces of the magnet, and an annular weight attached to the outer peripheral surface of the yoke. The vent passage means may have at least one recess formed in the outer peripheral surface of the weight. Alternatively, the vent passage means may have a through-hole provided on at least either the weight or the yoke.

DETAILED DESCRIPTION OF THE PREFERRED EMBODIMENTS

Vibrators according to embodiments of the present invention will be described below with reference to the accompanying drawings.

Figure 1:
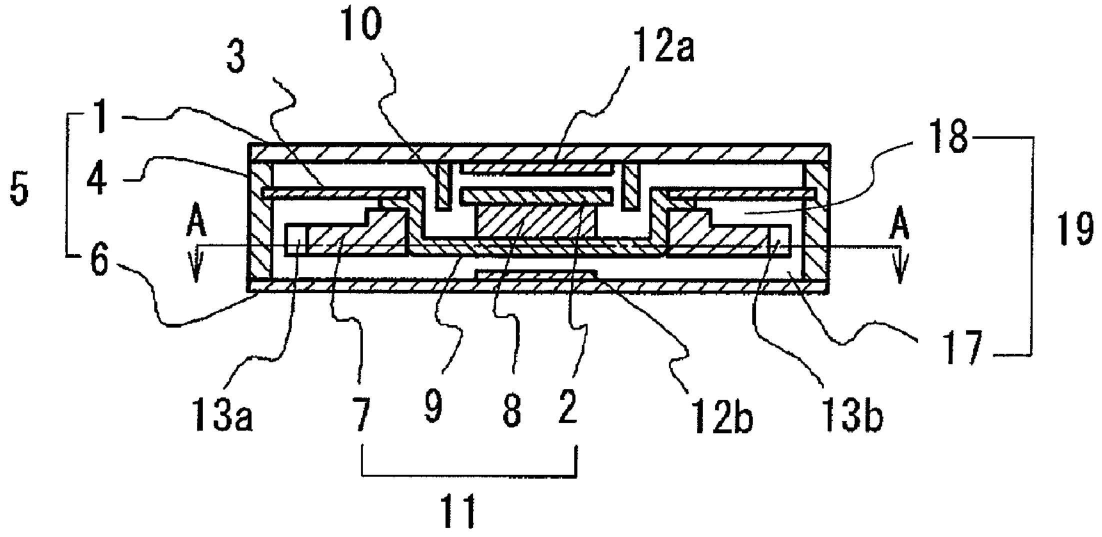
FIG. 1 is a sectional view of a vibrator according to a first embodiment of the present invention.
Figure 2:
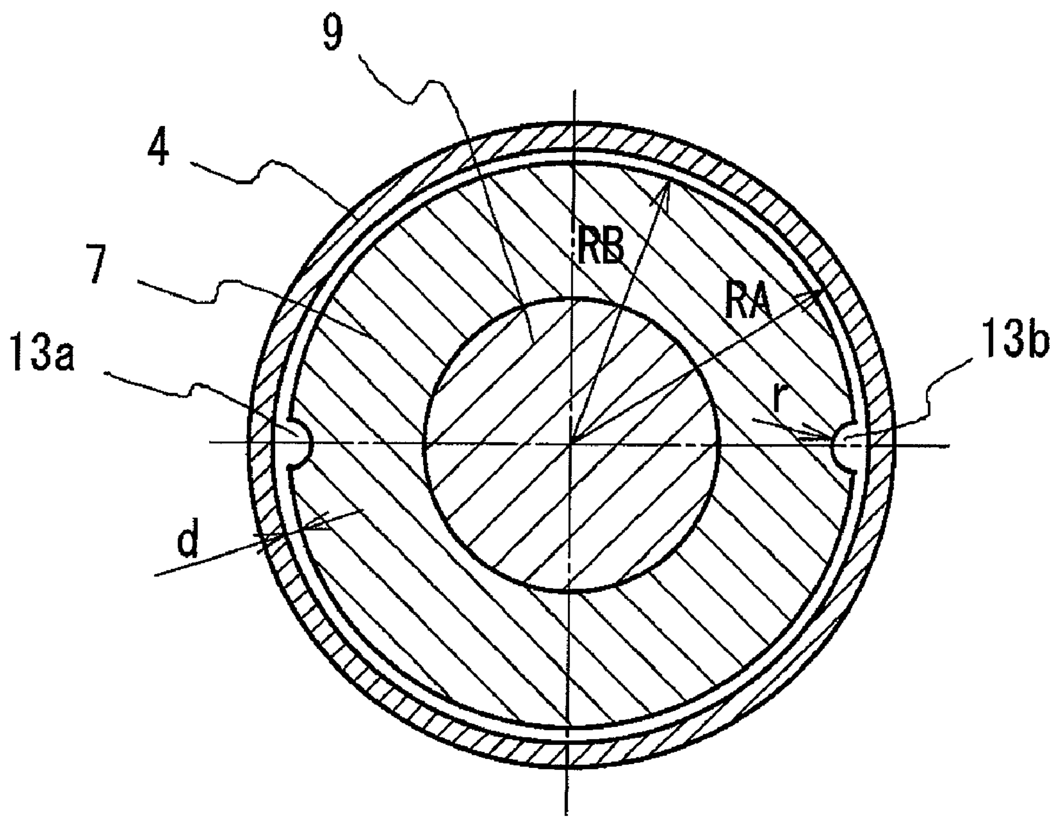
FIG. 2 is a sectional view taken along the line A-A in FIG. 1.

As shown in FIGS. 1 and 2, a vibrator according to a first embodiment of the present invention has a circular cylindrical coil 10, a magnetic circuit unit 11, and a suspension 3 that resiliently supports the magnetic circuit unit 11. When the coil 10 is supplied with a signal current, the magnetic circuit unit 11 is reciprocated in the axial direction of the coil 10, thereby generating vibration.

The coil 10, the magnetic circuit unit 11 and the suspension 3 are housed in a casing 5. The casing 5 has a tubular frame 4 surrounding the magnetic circuit unit 11, a board 1 closing one end opening of the frame 4, and a protector 6 closing the other end opening of the frame 4.

The board 1 may be a printed wiring board, an insert molding of metal peaces such as a lead frame, etc. A shock-absorbing member 12*a*, made of a foamed material, is provided on the side of the board 1 facing the magnetic circuit unit 11. Another shock-absorbing member 12*b* is provided on the inner surface of the protector 6 at a position corresponding to the magnetic circuit unit 11. The shock-absorbing members 12*a* and 12*b* increase the resonance frequency range of vibration of the vibrator to reduce the dependence on the resonance frequency.

The magnetic circuit unit 11 has a columnar magnet 8, a yoke 9 rigidly secured to one end surface of the magnet 8, and a top plate 2 rigidly secured to the other end surface of the magnet 8. Further, an annular weight 7 is attached to the yoke 9. The outer peripheral surface of the weight 7 is adjacent to the inner peripheral surface of the casing 5 across an annular gap. The interior 19 of the casing 5, in which the magnetic circuit unit 11 is housed, is an enclosed space. A first space 17 and a second space 18 are formed so as to face each other across the magnetic circuit unit 11 in an axial direction in which the magnetic circuit unit 11 reciprocates. Two recesses 13*a* and 13*b* are provided on the outer peripheral surface of the weight 7 as a vent passage additionally communicating between the spaces 17 and 18.

The recesses 13*a* and 13*b* are positioned in points symmetry with respect to the center of the weight 7, which is the center of the magnetic circuit unit 11. The recesses 13*a* and 13*b* extend in the direction of thickness of the weight 7, which is the direction of vibration of the magnetic circuit unit 11, and have a semicircular cross-sectional configuration. The cross-sectional area of the recesses 13*a* and 13*b* in a direction perpendicular to the vibration direction of the magnetic circuit unit 11 is preferably set to a minimal value within a range in which the vibrator can vibrate appropriately. The reason for this is that the mass of the magnetic circuit unit 11 needs to be increased to obtain a large vibration force from the vibrator.

Specifically, the radius RA of the inner wall of the frame 4 is set to 3.9 mm, and the outer diameter RB of the weight 7 is set to 3.8 mm. Hence, the value of the gap d between the inner wall of the frame 4 and the outer peripheral surface of the weight 7 is 0.1 mm. In this case, the area of the gap between the inner wall of the frame 4 and the outer peripheral surface of the weight 7 is approximately 2.4 $mm^2$. The radius r of the cross-sectional configuration of each of the recesses 13*a* and 13*b* on the weight 7 is set to 0.7 mm. The total area of the two recesses 13*a* and 13*b* is approximately 1.6 $mm^2$. Accordingly, when the two recesses 13*a* and 13*b* are provided on the outer peripheral surface of the weight 7 as a vent passage means, the overall area of the gap between the inner wall of the frame 4 and the outer peripheral surface of the weight 7 is approximately 4.0 $mm^2$. Thus, the gap area increases by approximately 70%.

Figure 9:
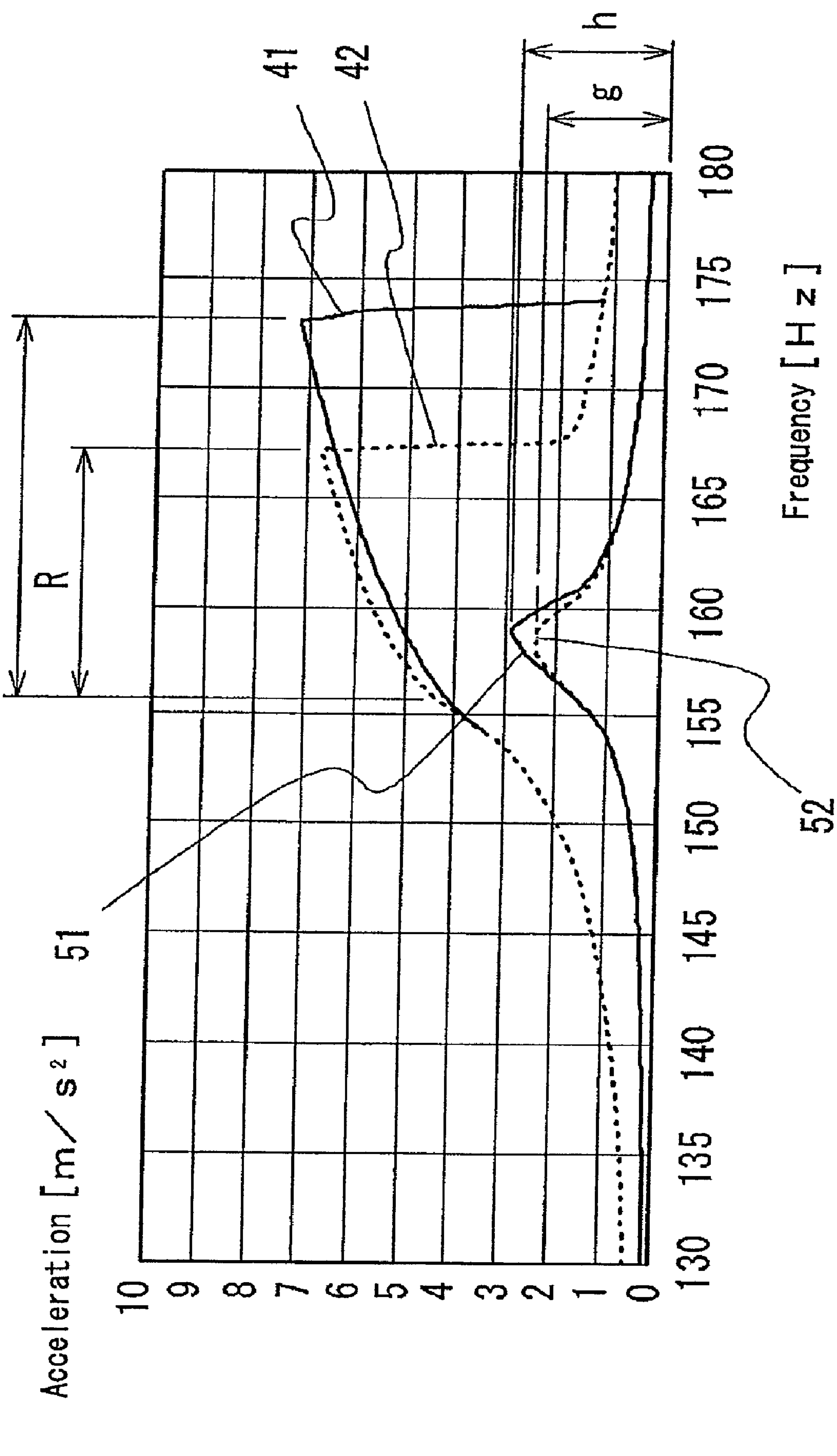
FIG. 9 is a graph showing the relationship between the frequency and acceleration of the vibrator according to the first embodiment of the present invention.
Figure 10:
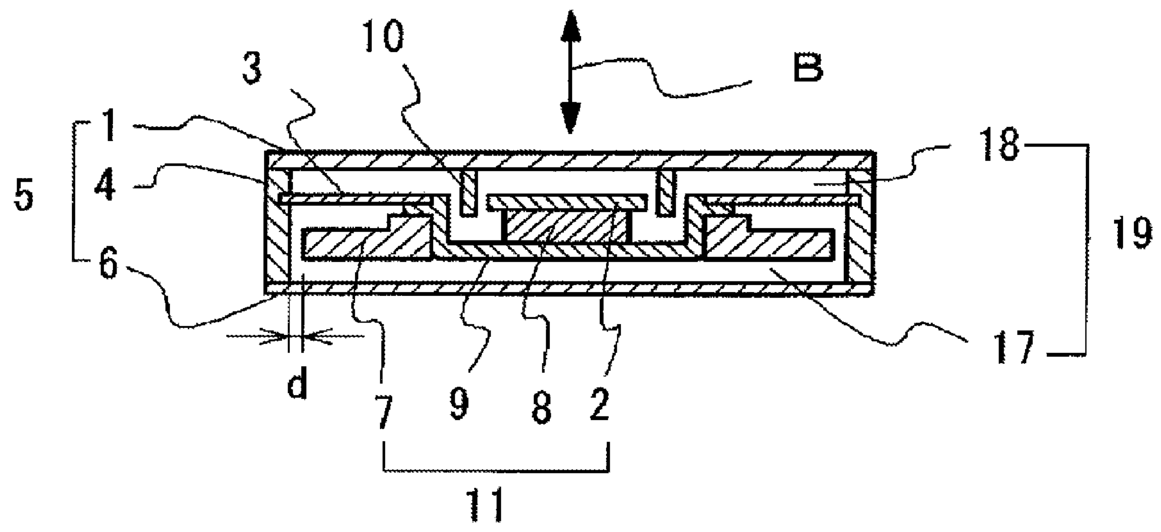
Fig. 10 Prior Art
FIG. 10 is a sectional view of a vibrator according to a conventional art.
Figure 11:
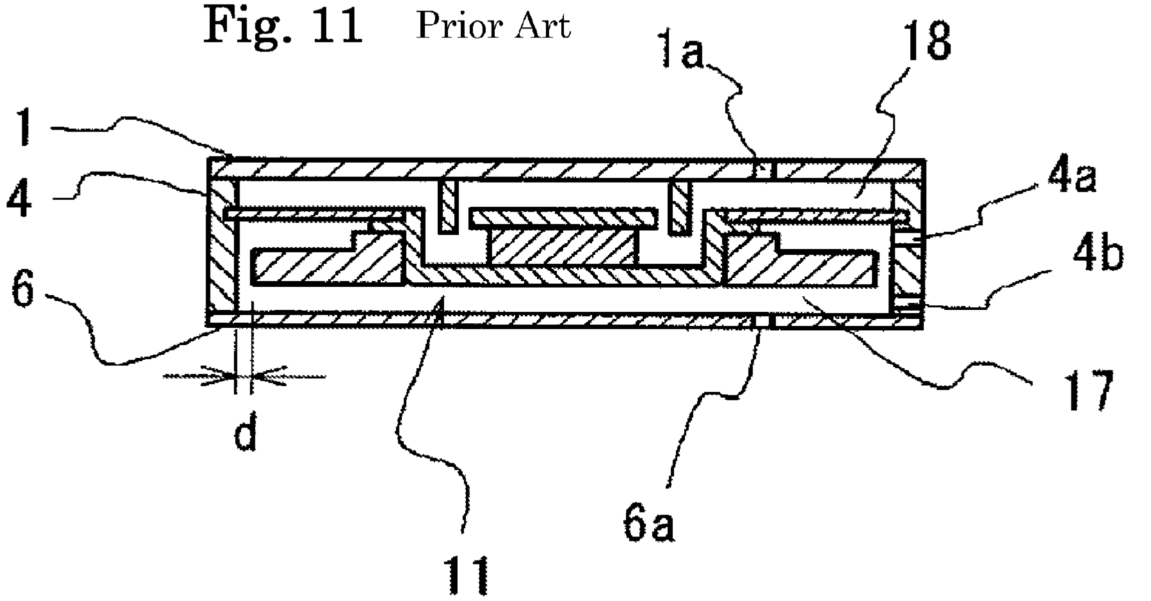
Fig. 11 Prior Art
FIG. 11 is a sectional view of a vibrator according to another conventional art.

FIG. 9 is a graph showing the relationship between the frequency and acceleration of the vibrator according to the embodiment shown in FIGS. 1 and 2. The ordinate axis represents the acceleration, and the abscissa axis represents the frequency. Curves 51 and 52 in FIG. 9 show frequency responses upon application of a voltage of such a level that the magnetic circuit unit 11 will not collide with either of the shock-absorbing members 12*a* and 12*b*. The solid-line curve 51 shows characteristics when the recesses 13*a* and 13*b* are provided. The dashed-line curve 52 shows characteristics when neither of the recesses 13*a* and 13*b* are provided. The acceleration (at frequencies at the resonance point and in vicinities thereof) h when the recesses 13*a* and 13*b* are provided, which is shown by the curve 51, is higher than the acceleration g when neither of the recesses 13*a* and 13*b* are provided, which is shown by the curve 52.

Curves 41 and 42 show frequency responses when the magnetic circuit unit 11 collides with the casing 5 through the shock-absorbing members 12*a* and 12*b*. The curves 41 and 42 have non-linear regions. The solid-line curve 41 shows characteristics when the recesses 13*a* and 13*b* are provided. The dashed-line curve 42 shows characteristics when neither of the recesses 13*a* and 13*b* are provided. As shown in the graph, the resonance frequency region S when the recesses 13*a* and 13*b* are provided, which is shown by the curve 41, is wider than the resonance frequency region R when neither of the recesses 13*a* and 13*b* are provided, which is shown by the curve 42. Accordingly, a stable vibrating operation can be obtained when the recesses 13*a* and 13*b* are provided. Thus, the sharpness (Q) of resonance can be adjusted in the range of about 40 to 60 by changing the ratio of the area of the gap between the inner wall of the frame 4 and the outer peripheral surface of the weight 7 to the total area of the two recesses 13*a* and 13*b*. Therefore, a desired sharpness (Q) of resonance can be appropriately selected in accordance with the purpose of use.

Thus, according to the vibrator of this embodiment, the value of the gap d between the inner wall of the frame 4 and the outer peripheral surface of the weight 7 is minimized to 0.1 mm, and the recesses 13*a* and 13*b* are provided on the outer peripheral surface of the weight 7 as a vent passage that provides communication for ventilation between the first and second spaces 17 and 18 in addition to the gap d, whereby the vibration level of the magnetic circuit unit 11 can be sufficiently increased. As a result, it becomes possible to realize miniaturization of the vibrator, and it is possible to implement a vibrator that can surely inform the user of an incoming call by vibration when mounted in a mobile phone or other small-sized portable devices.

In addition, because the interior 19 of the casing 5 is formed as an enclosed space, it is possible to prevent sound generated in the interior 19 of the casing 5 from leaking out of it as audible noise. Further, there is no possibility of external contamination such as dust entering the casing 5. Thus, it is possible to prevent the occurrence of interference with vibration and hence possible to improve reliability.

Figure 3:
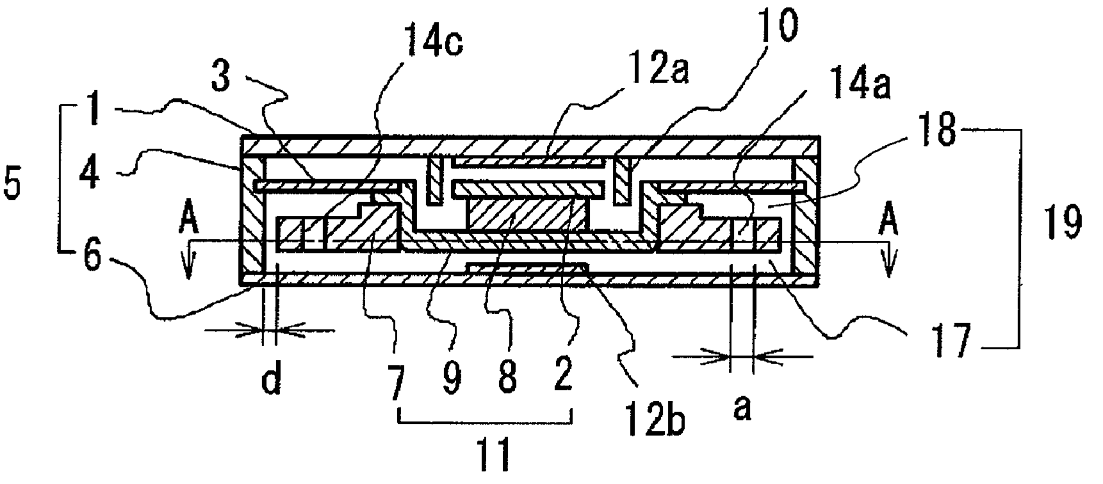
FIG. 3 is a sectional view of a vibrator according to a second embodiment of the present invention.
Figure 4:
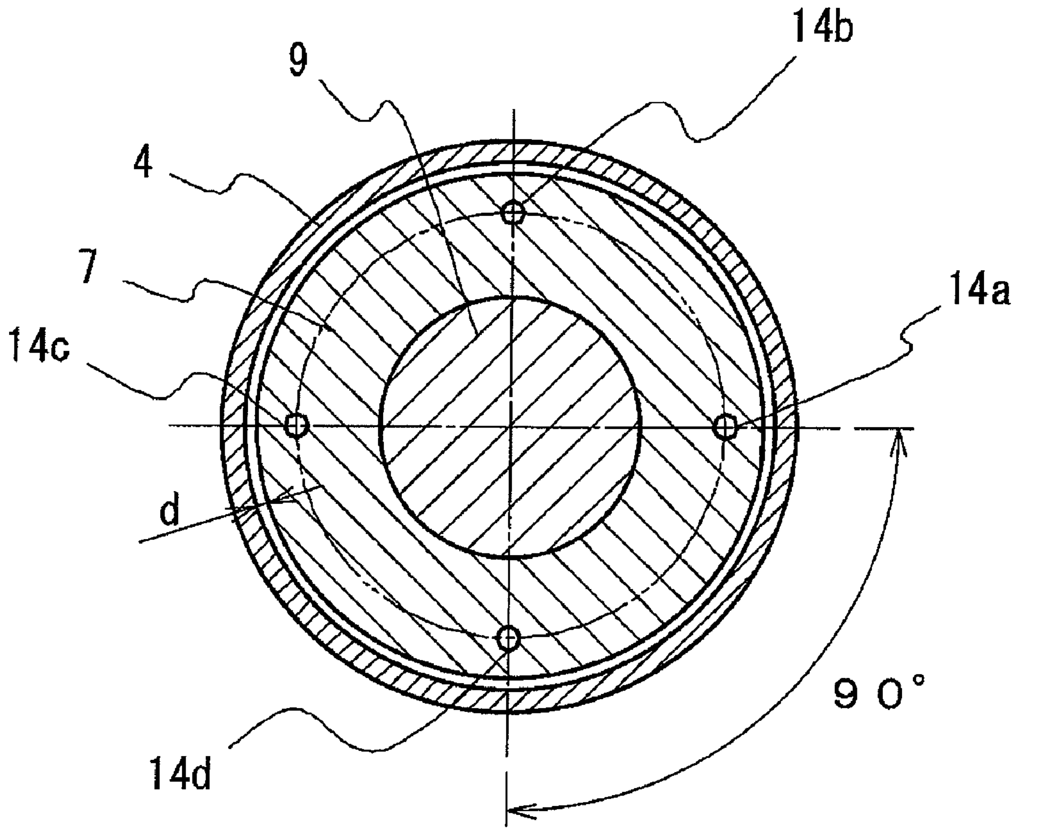
FIG. 4 is a sectional view taken along the line A-A in FIG. 3.

FIG. 3 is a sectional view showing a vibrator according to a second embodiment of the present invention. FIG. 4 is a sectional view taken along the line A-A in FIG. 3. In this vibrator, four through-holes 14*a*, 14*b*, 14*c* and 14*d* are provided in the weight 7 as a vent passage means that provides communication for ventilation between the first and second spaces 17 and 18. The second embodiment is the same as the first embodiment in the other points. The through-holes 14*a*, 14*b*, 14*c* and 14*d* have a diameter a of 0.7 mm and are equally spaced at 90 degrees on a circumference centered at the center axis of the weight 7. Thus, the total cross-sectional area of the four through-holes 14*a*, 14*b*, 14*c* and 14*d* is approximately 1.6 $mm^2$, which is the same as in the first embodiment. It should be noted that the value of the gap d between the inner wall surface of the frame 4 and the outer peripheral surface of the weight 7 is 0.1 mm, which is the same as in the first embodiment. The vibrator of this embodiment provides advantageous effects similar to those of the first embodiment.

Figure 5:
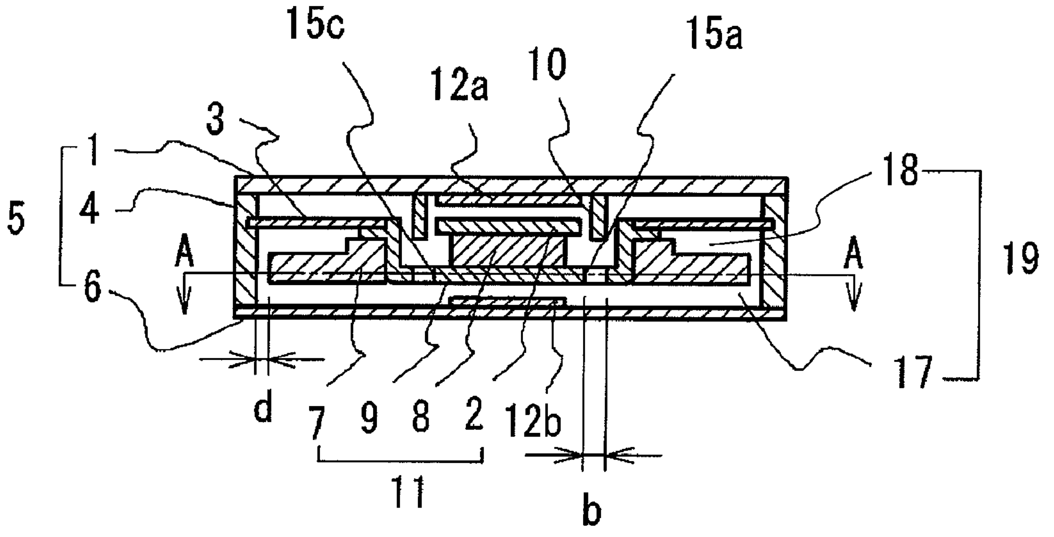
FIG. 5 is a sectional view of a vibrator according to a third embodiment of the present invention.
Figure 6:
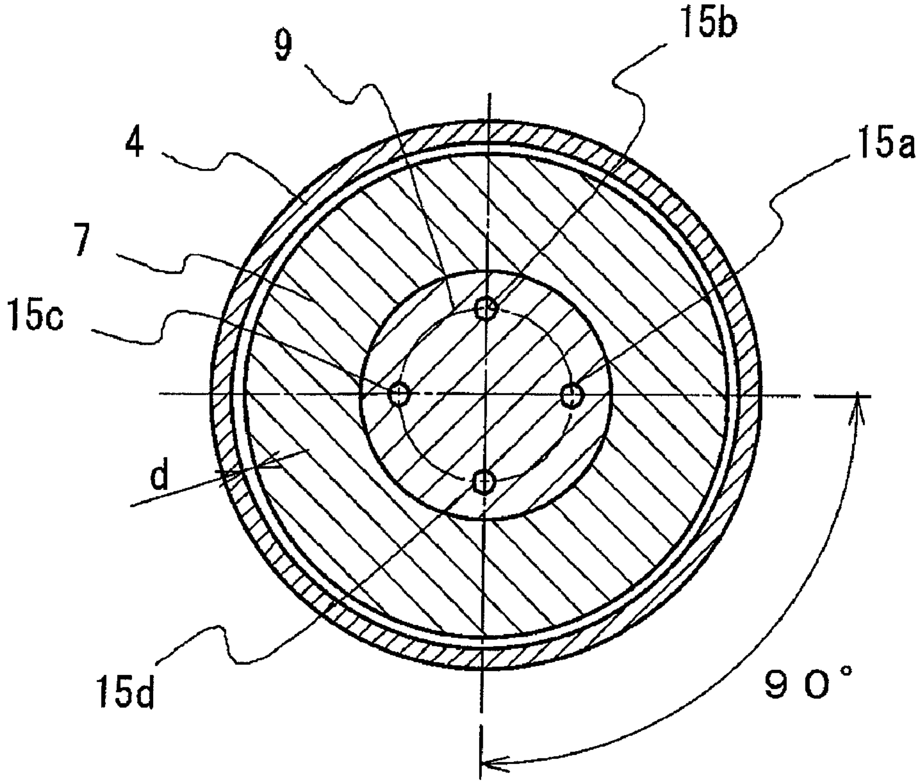
FIG. 6 is a sectional view taken along the line A-A in FIG. 5.

FIG. 5 is a sectional view showing a vibrator according to a third embodiment of the present invention. FIG. 6 is a sectional view taken along the line A-A in FIG. 5. In this vibrator, four through-holes 15*a*, 15*b*, 15*c* and 15*d* are provided as a vent passage means in the yoke 9, which constitutes the magnetic circuit unit 11. The third embodiment is the same as the first embodiment in the other points. The through-holes 15*a*, 15*b*, 15*c* and 15*d* have a diameter b of 0.7 mm and are equally spaced at 90 degrees on a circumference centered at the center axis of the yoke 9. The value of the gap d between the inner wall surface of the frame 4 and the outer peripheral surface of the weight 7 is 0.1 mm, which is the same as in the first embodiment.

Figure 7:
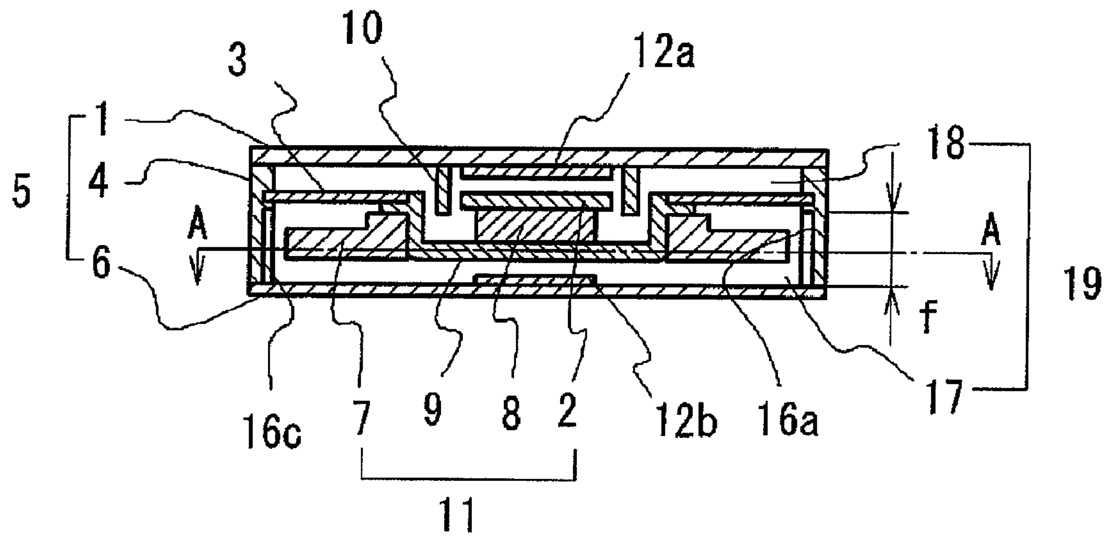
FIG. 7 is a sectional view of a vibrator according to a fourth embodiment of the present invention.
Figure 8:
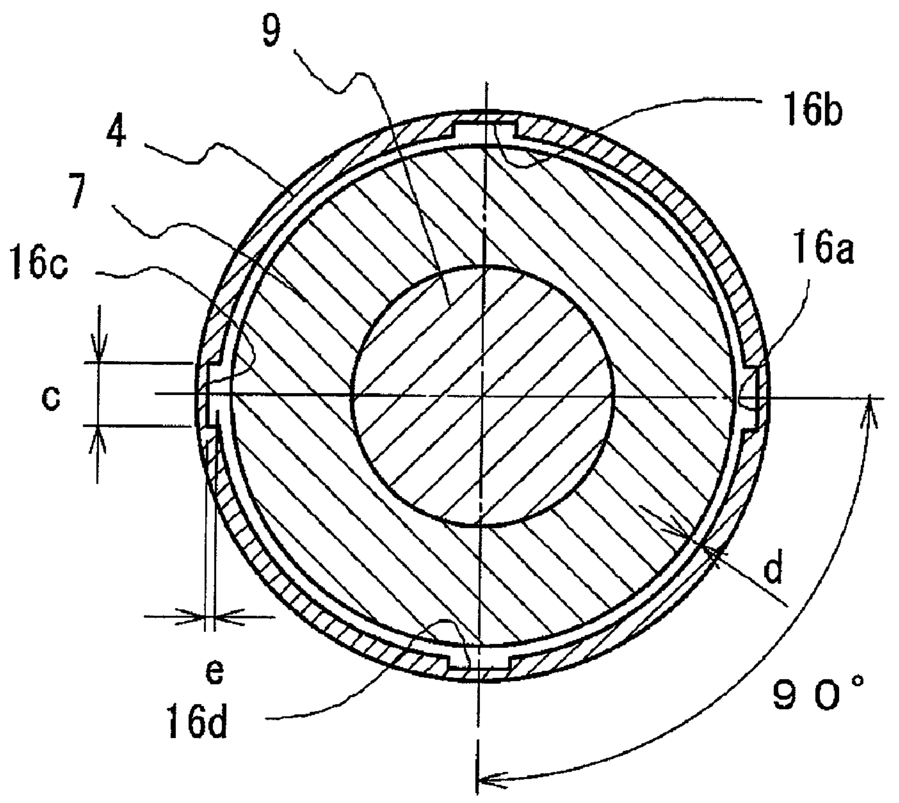
FIG. 8 is a sectional view taken along the line A-A in FIG. 7.

FIG. 7 is a sectional view showing a vibrator according to a fourth embodiment of the present invention. FIG. 8 is a sectional view taken along the line A-A in FIG. 7. In this vibrator, four recesses 16*a*, 16*b*, 16*c* and 16*d* are provided as vent passage means on the inner peripheral surface of the casing. The fourth embodiment is the same as the first embodiment in the other points. The recesses 16*a*, 16*b*, 16*c* and 16*d* have a width c of 1.0 mm and a depth e of 0.4 mm and are equally spaced at 90 degrees on a circumference centered at the center axis of the frame 4. The total cross-sectional area of the four recesses 16*a*, 16*b*, 16*c* and 16*d* is approximately 1.6 $mm^2$, which is the same as in the first embodiment. The recesses 16*a*, 16*b*, 16*c* and 16*d* extend through a length f beyond the vibration range of the magnetic circuit unit 11 in the vibration direction thereof. The value of the gap d between the inner wall surface of the frame 4 and the outer peripheral surface of the weight 7 is 0.1 mm, which is the same as in the first embodiment.

Although in the first to fourth embodiments two or four recesses or through-holes are provided, by way of example, as vent passage means that provide further communication for ventilation between the first and second spaces 17 and 18, the present invention is not necessarily limited thereto. The number of recesses or through-holes may be appropriately set according to circumstances. There is no particular restriction on the cross-sectional configuration of the recesses and the through-holes.

Although in the foregoing embodiments recesses or through-holes are provided as vent passage means on one of the constituent elements, i.e. the frame 4, the weight 7, or the yoke 9, the present invention is not necessarily limited thereto. Such recesses or through-holes may be provided on other constituent elements. A vent passage means may be provided on a plurality of constituent elements, e.g. on the frame 4 and the weight 7, or on the weight 7 and the yoke 9.

Although in the foregoing embodiments the casing 5 comprises the frame 4, the protector 6 and the board 1, by way of example, the present invention is not necessarily limited thereto. The frame 4 and the protector 6 may be integrally formed.

The invention claimed is:

1. A vibrator comprising:

a tubular casing that defines an enclosed space;

a coil disposed in the casing in coaxial relation to the casing;

a magnetic circuit unit disposed in the casing in coaxial relation to the casing, the magnetic circuit unit having an extent in a radial direction to define a first space and a second space at both sides of the magnetic circuit unit in an axial direction of the tubular casing, and the magnetic circuit unit having an outer peripheral surface positioned adjacent to an inner peripheral surface of the casing with an annular gap interposed between the outer peripheral surface of the magnetic circuit unit and the inner peripheral surface of the casing;

a suspension that resiliently supports the magnetic circuit unit such that the magnetic circuit unit is vibratable in the axial direction in response to supply of a signal current to the coil; and a vent passage that provides communication in the casing between the first space and the second space, the vent passage comprising at least one recess that is formed in the inner peripheral surface of the casing and extends between the first space and the second space.

2. A vibrator comprising:

a tubular casing that defines an enclosed space;

a coil disposed in the casing in coaxial relation to the casing;

a magnetic circuit unit disposed in the casing in coaxial relation to the casing, the magnetic circuit unit having an extent in a radial direction to define a first space and a second space at both sides of the magnetic circuit unit in an axial direction of the tubular casing, and the magnetic circuit unit having an outer peripheral surface positioned adjacent to an inner peripheral surface of the casing with an annular gap interposed between the outer peripheral surface of the magnetic circuit unit and the inner peripheral surface of the casing;

a suspension that resiliently supports the magnetic circuit unit such that the magnetic circuit unit is vibratable in the axial direction in response to supply of a signal current to the coil; and a vent passage that provides communication in the casing between the first space and the second space, the vent passage comprising at least one recess that is formed in the outer peripheral surface of the magnetic circuit unit and extends between the first space and the second space.

3. The vibrator of claim 2, wherein the magnetic circuit unit comprises a columnar magnet having opposite end surfaces, a yoke rigidly secured to one of the opposite end surfaces of the magnet and having an outer periphery surface, a top plate rigidly secured to the other of the opposite end surfaces of the magnet, and an annular weight attached to the outer peripheral surface of the yoke, the at least one recess formed in an outer peripheral surface of the weight.

4. The vibrator of claim 1, wherein the at least one recess comprises four recesses that are formed in the inner peripheral surface of the casing and that are equally spaced at 90 degrees.

5. The vibrator of claim 2, wherein the at least one recess has a semicircular cross-sectional configuration.

6. The vibrator of claim 3, wherein the at least one recess comprises two recesses that are positioned symmetrically with respect to a center of the weight.

* * * * *